United States Patent
Jiang

(10) Patent No.: US 11,161,184 B2
(45) Date of Patent: Nov. 2, 2021

(54) QUICK-CHANGING BRAZED DRILL

(71) Applicant: JALOR INDUSTRY CO., LTD., Dan Yang (CN)

(72) Inventor: Ning Jiang, Dan Yang (CN)

(73) Assignee: JALOR INDUSTRY CO., LTD., Dan Yang (CN)

( * ) Notice: Subject to any disclaimer, the term of this patent is extended or adjusted under 35 U.S.C. 154(b) by 212 days.

(21) Appl. No.: 16/387,549

(22) Filed: Apr. 18, 2019

(65) Prior Publication Data

US 2020/0198067 A1 Jun. 25, 2020

(30) Foreign Application Priority Data

Dec. 19, 2018 (CN) .......................... 201811551876.X
Dec. 19, 2018 (CN) .......................... 201822128967.4

(51) Int. Cl.
*B23B 51/04* (2006.01)
*B23B 31/11* (2006.01)
(Continued)

(52) U.S. Cl.
CPC .......... *B23B 51/0406* (2013.01); *B23B 31/11* (2013.01); *B23B 31/113* (2013.01); *B23B 51/0473* (2013.01); *B28D 1/041* (2013.01)

(58) Field of Classification Search
CPC . B23B 51/0473; B23B 51/0406; B23B 51/05; B23B 51/12; B23B 51/123;
(Continued)

(56) References Cited

U.S. PATENT DOCUMENTS 2,856,157 A * 10/1958 Chapin ............... B23B 51/0406
175/394
4,478,297 A * 10/1984 Radtke .................... E21B 10/61
175/432
(Continued)

FOREIGN PATENT DOCUMENTS

EP 2826579 B1 * 4/2017 ......... B23B 51/0473
EP 3184218 A1 * 6/2017 ............. B28D 1/041
EP 3184219 A1 * 6/2017 ......... B23B 51/0473

OTHER PUBLICATIONS

Machined Translation, EO 3184218A1. Jun. 2017. (Year: 2017).*

*Primary Examiner* — Eric A. Gates
*Assistant Examiner* — Chwen-Wei Su
(74) *Attorney, Agent, or Firm* — Bayramoglu Law Offices LLC

(57) ABSTRACT

A quick-changing brazed drill includes a drill body and a quick-changing joint. The drill body is connected to the quick-changing joint detachably, and a vent hole is provided at a connection point between the drill body and the quick-changing joint. The drill body has a cylindrical structure, an interior of a front end of the drill body is hollow, and an outer side of the front end of the drill body is provided with 2-6 grooves. The quick-changing joint includes a transition block and a rear cover; a rear end of the transition block is connected to the rear cover by an external thread; a snap-fit area is provided between the transition block and the rear cover; a middle portion of the transition block is provided with a first threaded hole and is connected to a rear end of the drill body.

6 Claims, 3 Drawing Sheets

(51) Int. Cl.
*B28D 1/04* (2006.01)
*B23B 31/113* (2006.01)

(58) Field of Classification Search
CPC ... B23B 2226/75; B23B 31/11; B23B 31/113; B28D 1/041; B28D 1/04; B28D 1/146; B28D 1/14; Y10T 408/81; Y10T 408/895; Y10T 408/8957; Y10T 408/896; Y10T 408/73; Y10T 408/75
See application file for complete search history.

(56) References Cited

U.S. PATENT DOCUMENTS

| | | | | |
|---|---|---|---|---|
| 4,494,618 A | * | 1/1985 | Radtke | E21B 10/61 175/393 |
| 5,092,716 A | * | 3/1992 | Omi | B23D 59/025 408/204 |
| 5,865,571 A | * | 2/1999 | Tankala | B28D 1/041 408/1 R |

* cited by examiner

QUICK-CHANGING BRAZED DRILL

CROSS REFERENCE TO RELATED APPLICATIONS

This application is based upon and claims priority to Chinese Patent Application No. 201811551876.X, filed on Dec. 19, 2018, and Chinese Patent Application No. 201822128967.4, filed on Dec. 19, 2018, the entire contents of which are incorporated herein by reference.

TECHNICAL FIELD

The present invention belongs to the technical field of drilling tools, and particularly relates to a quick-changing brazed drill.

BACKGROUND

With the continuous progress of the society, people's requirements for the living quality is becoming higher and higher, and the requirements on the quality for house decoration is also becoming increasingly higher. When opening a hole on a material such as a tile which has a high hardness and is easy to break, it is necessary to use a drill (also known as a hole opener) to slowly open the hole thereon. Currently, opening a hole on the tile is relatively time-consuming. Most drills commercially available can only drill less than 20 holes, and have a relatively short service life. The drills will be scrapped after reaching their service lives. The structure of the drill includes a cylindrical cutter bit part, a cutter shank and a reinforcement block at the middle, so the cost is relatively high. Meanwhile, the service life of the drill is short, which leads to an increase pressure on the consumer's consumption cost. For another aspect, ordinary drills can only be mounted on corresponding machines capable of assembly, such as a gun drill. Consumers who want to use another machine to drill holes must purchase additional products that are matched with this machine. The existing drill has a narrow scope of application, and needs to be improved by those skilled in the art.

SUMMARY

In order to solve the above-mentioned problems, the present invention discloses a quick-changing brazed drill. The drill and a rear cover thereof are arranged in a detachable structure, which facilitates replacement, reduces cost, and avoids unnecessary waste. Moreover, the drill and the quick-changing joint are firmly connected, the hole-opening rate is higher, and the service life is longer.

In order to achieve the above objective, the technical solution of the present invention is as follows.

A quick-changing brazed drill includes a drill body and a quick-changing joint. The drill body and the quick-changing joint are connected detachably, and a vent hole is provided at a connection point between the drill body and the quick-changing joint.

As an improvement of the present invention, the drill body has a cylindrical structure, an interior of a front end of the drill body is hollow, and an outer side of the front end of the drill body is provided with 2-6 grooves.

As an improvement of the present invention, two symmetrical first clamping surfaces are arranged in a middle portion of a side surface of the drill body.

As an improvement of the present invention, the quick-changing joint includes a transition block and a rear cover. A rear end of the transition block is connected to the rear cover by an external thread. A snap-fit area is provided between the transition block and the rear cover. A middle portion of the transition block is provided with a first threaded hole and is connected to a rear end of the drill body. The vent hole is configured at a rear end of the first threaded hole, and a diameter of the vent hole is smaller than a diameter of the first threaded hole. A central portion of the rear cover is provided with a spline hole. The vent hole, the first threaded hole, and the spline hole are arranged on a same axis.

As an improvement of the present invention, the external thread and a thread inside the first threaded hole are right-handed threads.

As an improvement of the present invention, a side surface of the transition block of the quick-changing joint is provided with two symmetrical second clamping surfaces.

As an improvement of the present invention, a diameter of the drill body is 5-20 mm.

As an improvement of the present invention, a diameter of the spline hole is 5-40 mm. As an improvement of the present invention, the quick-changing joint includes a connecting block and a tapered block. A front end of the tapered block is provided with a second threaded hole and is connected to the rear end of the drill body. The connecting block is configured at a rear end of the tapered block. A third threaded hole is provided inside a rear end of the connecting block. The vent hole is configured at a rear end of the second threaded hole and interconnected to the third threaded hole. The diameter of the vent hole is smaller than a diameter of the second threaded hole.

As an improvement of the present invention, a diameter of the third threaded hole is 6-20 mm.

A manufacturing process of a quick-changing brazed drill according to the present invention includes the following steps:

(1) processing a drill base, a joint and a rear cover;
(2) adjusting an adhesive, and dispensing the adhesive on the drill base;
(3) dispensing diamonds on the drill base, and dispensing a solder on a drill bit base; and a weight ratio of the solder is: Ni (84%), Fe (4%), Cr (9%), Ti (3%);
(4) vacuum brazing and sintering a drill;
(5) punching the rear cover;
(6) assembling the drill, the joint and the rear cover;
(7) performing overall sandblasting and painting; and
(8) laser marking and packaging.

The advantages of the present invention are as follows.

The quick-changing brazed drill of the present invention has the following advantages compared with the products available now:

1. The aspect of cost: in order to reduce the use cost for the consumers, according to the present invention, a quick-changing joint is added, the scraped drill can be quickly replaced, and a new drill may be installed on the quick-changing joint. By doing so, the cost is reduced, and unnecessary waste is avoided. For example, the market price of an ordinary drill with a specification of M14φ20 mm is about 50 RMB, after using the quick-changing joint designed by the Inventor, only the scrapped drill bit part needs to be replaced, thus the customer can save about 60% in the use cost.

2. The aspect of convenience: according to the present invention, the drill and the rear cover are arranged in a detachable structure, making it convenient and fast to replace the drill. Moreover, a vent hole is provided at a connection point between the drill body and the quick-changing joint, so that the installation of the drill is faster and more stable.

3. The aspect of universality: the drill of the present invention can be freely matched with different types of machines conveniently. For example, the drill body can be directly assembled to a gun drill for drilling; and the drill body can also be mounted on an angle grinder with a faster rotation speed for drilling. In addition, the rear covers (the diameters of the spline holes thereof are different) with different aperture diameters are provided for customers to be matched with different models and different specifications of angle grinders at home and abroad.

4. The aspect of speed: the drill of the present invention is designed into a split-tooth groove type to improve the cutting speed. For example, the drill is mounted on an ordinary gun drill to drill holes on Italian imported tiles having a thickness of 10 mm. The average time for drilling is only about 35 seconds, and the drilling speed is increased by 20%.

5. The aspect of service life: for the drill of the present invention, the brazing technology is used, the design of the cutter bit structure is optimized, and the formula of the powder material of the cutter bit is upgraded, thus having a longer service life. The drill of the present invention can drill more than 40 holes on the Italian imported ceramic tiles, and the service life is increased by 1-2 times.

Figure 1:
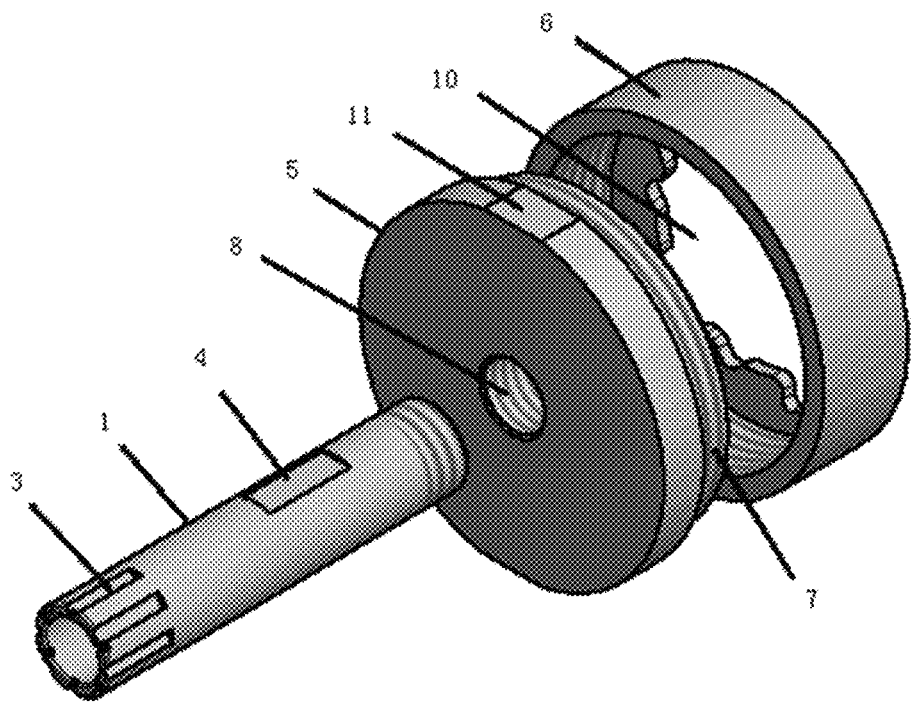
FIG. 1 is an exploded view of a first embodiment of the present invention.
Figure 2:
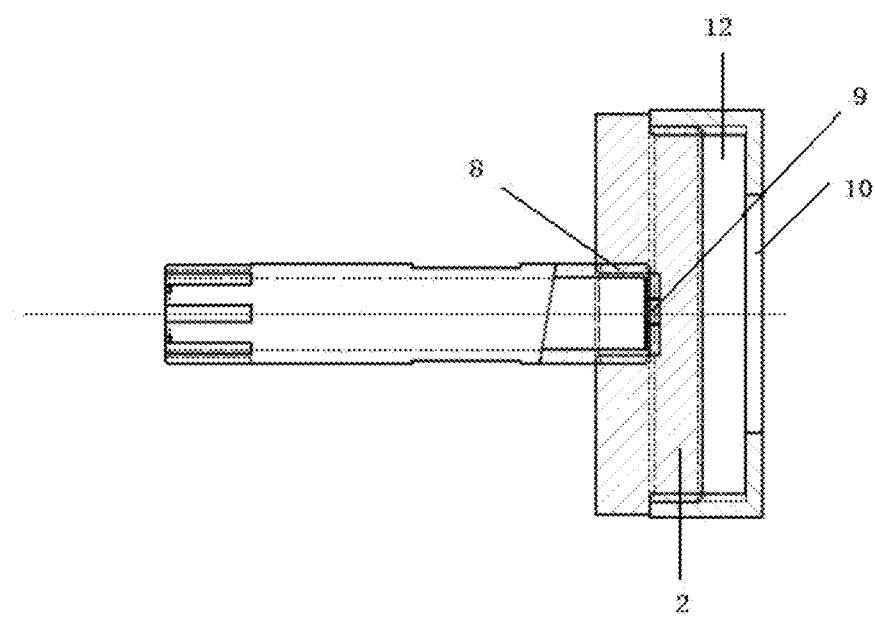
FIG. 2 is a cross-sectional view of a first embodiment of the present invention.
Figure 3:
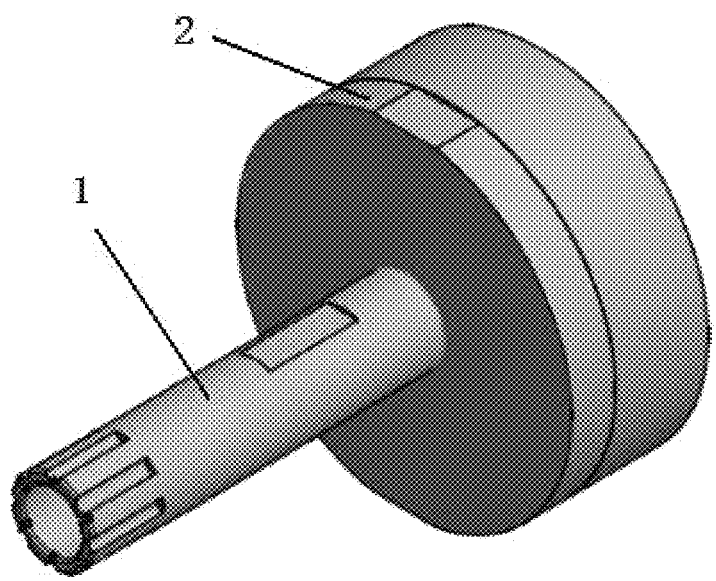
FIG. 3 is a perspective view of a first embodiment of the present invention.
Figure 4:
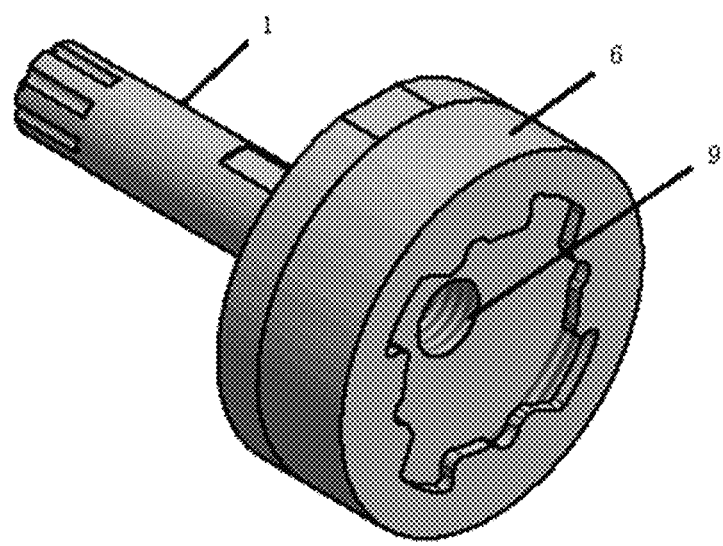
FIG. 4 is a rear view of a first embodiment of the present invention.

LIST OF REFERENCE DESIGNATORS 1. drill body, 2. quick-changing joint, 3. groove, 4. first clamping surface, 5. transition block, 6. rear cover, 7. external thread, 8. first threaded hole, 9. vent hole, 10. spline hole, 11. second clamping surface, 12. snap-fit area, 13. connecting block, 14. tapered block, 15. second threaded hole, 16. third threaded hole.

DETAILED DESCRIPTION OF THE EMBODIMENTS

The present invention will be further illustrated below with reference to the drawings and specific embodiments. It should be understood that the following specific embodiments are merely used to describe the present invention, rather than to limit the scope of the present invention. It should be noted that the terms "front", "rear", "left", "right", "upper" and "lower" used in the following description refer to the directions in the drawings, the terms "inside" and "outside" refer to the direction toward or away from the geometric center of a particular component, respectively.

As shown in figures, according to the present invention, a quick-changing brazed drill includes the drill body 1 and the quick-changing joint 2. The drill body 1 and the quick-changing joint 2 are connected detachably; the connection method can be a threaded connection, or an intercepting method using a latch or a circlip; and the main purpose is to facilitate the rapid disassembly and assembly. The vent hole 9 is provided at a connection point between the drill body 1 and the quick-changing joint 2, so that the drill body 1 can be installed more quickly and stably without air resistance.

The drill body 1 is designed into a split-tooth groove type. Specifically, the drill body 1 has a cylindrical structure, the interior of the front end of the drill body 1 is hollow, and the outer side of the front end of the drill body 1 is provided with 2-6 of the grooves 3. This structure design improves the cutting speed and increases the drilling speed by 20%. Moreover, for the drill of the present invention, the brazing technology is used, the design of the cutter bit structure is optimized, and the formula of the powder material of the cutter bit is upgraded, thus the service life is increased by 1-2 times.

The quick-changing joint 2 of the present invention has the following two structures:

Embodiment 1

As shown in FIG. 1, the first quick-changing joint includes the transition block 5 and the rear cover 6. The rear end of the transition block 5 is connected to the rear cover 6 by the external thread 7. The snap-fit area 12 is provided between the transition block 5 and the rear cover 6. The middle portion of the transition block 5 is provided with the first threaded hole 8 and is connected to the rear end of the drill body 1. The vent hole 9 is configured at the rear end of the first threaded hole 8, and a diameter of the vent hole 9 is smaller than the diameter of the first threaded hole 8. The central portion of the rear cover 6 is provided with the spline hole 10. The vent hole 9, the first threaded hole 8, and the spline hole 10 are arranged on a same axis. The external thread 7 and the thread inside the first threaded hole 8 are right-handed threads.

The first quick-changing joint as described in Embodiment 1 can be mounted on an angle grinder. A front end of a motor connecting shaft of the angle grinder is inserted into the snap-fit area 12 from the spline hole 10 of the rear cover 6 to drive the drill body 1 to rotate. Since the threads at the two connection points have reverse teeth, when the threads are right-hand twisted clockwise, the threads are loosen. When the threads are twisted counterclockwise, the treads are tightened. Namely, when the angle grinder rotates normally, the drill body 1, the transition block 5 and the rear cover 6 will become e tighter and tighter, which can ensure the stability of the first quick-changing joint.

The vent hole 9 of this embodiment is configured at the rear end of the first threaded hole 8, and the diameter of the vent hole 9 is smaller than the diameter of the threaded hole 8. This not only limits the stroke length of the drill body 1, but also ensures that when the drill body 1 is screwed into the first threaded hole 8, there is no air resistance, and the replacement is quicker and more convenient.

In this embodiment, two symmetrical first clamping surfaces 4 are arranged in the middle portion of the side surface of the drill body 1 to facilitate the rapid disassembly and assembly of the drill body 1. Two symmetrical second clamping surfaces 11 are provided on the side surface of the transition block 5 of the quick-changing joint 2 to facilitate the separation of the transition block 5 from the rear cover 6.

The drill as described in this embodiment can be freely matched with different types of machines conveniently. For example, the drill body 1 and the quick-changing joint 2 can be mounted on an angle grinder with a faster rotation speed for drilling; and the drill body 1 can also be directly assembled to a gun drill for drilling, and the diameter of the drill body 1 is 5-20 mm. In addition, the rear covers (the diameters of the spline holes thereof are 5-40 mm) with different aperture diameters are provided for customers to be matched with different models and different specifications of angle grinders or gun drills at home and abroad, achieving a wide application range.

Embodiment 2

Figure 5:
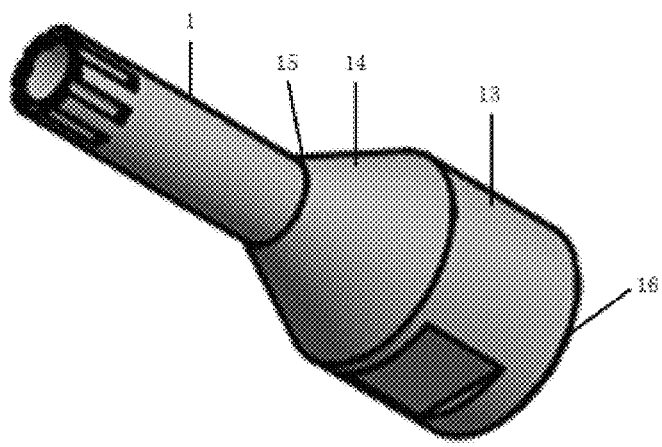
FIG. 5 is a perspective view of a second embodiment of the present invention.
Figure 6:
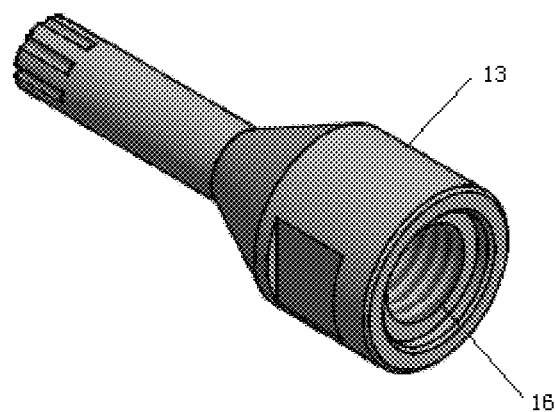
FIG. 6 is a rear view of a second embodiment of the present invention.

As shown in FIG. 5, the second quick-changing joint includes the connecting block 13 and the tapered block 14. The front end of the tapered block 14 is provided with the second threaded hole 15 and is connected to the rear end of the drill body 1. The connecting block 13 is configured at the rear end of the tapered block 14. The third threaded hole 16 is provided inside the rear end of the connecting block 13. The vent hole 9 is configured at the rear end of the second threaded hole 15 and interconnected to the third threaded hole 16. The diameter of the vent hole 9 is smaller than the diameter of the second threaded hole 15.

Embodiment 2 is the same as Embodiment 1 in that the drill body 1 can be disassembled and then mounted on angle grinders or pistol drills of different models and specifications for drilling. The difference between Embodiment 2 and Embodiment 1 lies in that the motor connecting shaft of the angle grinder is connected to the second quick-changing joint by the third threaded hole 16 to drive the drill body 1 to rotate, and the rear end of the third threaded hole 16 is also provided with the vent hole 9.

The third threaded hole 16 of the present embodiment has a diameter of 6-20 mm, and can be matched with different models and different specifications of large or small angle grinders at home and abroad, having a wide application range.

A manufacturing process of the quick-changing brazed drill according to the present invention includes the following steps:

(1) a drill base, a joint and a rear cover are processed;
(2) an adhesive is adjusted, and the adhesive is dispensed on a drill base;
(3) a diamond is dispensed on the drill base, and a solder is dispensed on the drill bit base; and a weight ratio of the solder is: Ni (84%), Fe (4%), Cr (9%), Ti (3%);
(4) a drill is vacuum brazed and sintered;
(5) the rear cover is punched;
(6) the drill, the joint and the rear cover are assembled;
(7) an overall sandblasting and a painting are performed; and
(8) a laser marking and a packaging are performed.

The drill of the present invention has a scientific manufacturing process. The brazing technology is used to improve the strength, the design of the cutter bit structure is optimized, and the formula of the powder material of the cutter bit is upgraded, so that the service life of the drill is longer. The drilling experiments are shown as follows.

Test Material:
1. hard tile model: Italian imported tiles (STGEA2-H2);
2. hardness level of tile: 8
3. size of hard tile: 472 mm×409 mm×10 mm
4. weight: 10 kg.

Test tool: 1. Mac Allister gun drill; 2. power: 600 kW; 3. speed: 2900 rpm.

Test method: dry drill (cooling with coolant)

Ordinary Drill φ10 mm Available on the Market

| serial number | time consuming (per hole) s | | | | |
|---|---|---|---|---|---|
| 1-5 | 21.70 | 23.50 | 28.10 | 42.50 | 28.80 |
| 6-10 | 38.20 | 51.60 | 28.40 | 53.10 | 47.60 |
| 11-15 | 30.50 | 31.60 | 40.40 | 37.60 | 55.70 |
| 16-20 | 52.30 | 52.70 | 71.30 | 77.80 | 62.70 |
| 21-25 | | | | | |
| 26-30 | | | | | |
| 31-35 | | | | | |
| 36-40 | | | | | |
| 41-45 | | | | | |
| average | 43.81 | | cooling time (s) | 2.00 | |
| average speed (s/per) | 43.81 | | lifetime (number of hole) | 20 | |

Quick-Changing Brazed Drill φ10 mm

| serial number | time consuming (per hole) s | | | | |
|---|---|---|---|---|---|
| 1-5 | 25.00 | 18.00 | 28.00 | 24.00 | 22.00 |
| 6-10 | 22.00 | 23.00 | 32.00 | 31.00 | 27.00 |
| 11-15 | 30.00 | 34.00 | 33.00 | 45.00 | 39.00 |
| 16-20 | 38.00 | 41.00 | 46.00 | 44.00 | 39.00 |
| 21-25 | 44.00 | 32.00 | 32.00 | 27.00 | 27.00 |
| 26-30 | 26.00 | 33.00 | 33.00 | 31.00 | 35.00 |
| 31-35 | 37.00 | 48.00 | 49.00 | 58.00 | 41.00 |
| 36-40 | 46.00 | 48.00 | 54.00 | 41.00 | 43.00 |
| 41-45 | | | | | |
| average | 35.65 | | cooling time (s) | 2.00 | |
| average speed (s/per) | 35.65 | | lifetime (number of hole) | >40 | |

It can be seen from the comparison experiment that:

1. The service life of the ordinary drill is about for drilling 20 holes; and the service life of the quick-changing brazed drill of the present invention is for drilling more than 40 holes. The service life of the quick-changing brazed drill of the present invention is over two times longer than that of the ordinary drill.

2. The average drilling speed of the ordinary drill is about 43 seconds; and the quick-changing brazed drill of the present invention only takes about 35 seconds. The speed is increased by about 20%.

The technical means disclosed in the technical solution of the present invention is not limited within the technical means disclosed in the above embodiments, but includes a technical solution composed of any combination of the above technical features.

What is claimed is:

1. A quick-changing brazed drill, comprising: a drill body, and
a quick-changing joint;
wherein the drill body is connected to the quick-changing joint detachably, and a vent hole is provided at a connection point between the drill body and the quick-changing joint,
wherein the drill body has a cylindrical structure, an interior of a front end of the drill body is hollow, and
an outer side of the front end of the drill body is provided with 2-6 grooves;
wherein the quick-changing joint comprises a transition block and a rear cover;
a rear end of the transition block is connected to the rear cover by an external thread;
a snap-fit area is provided between the transition block and the rear cover;
a middle portion of the transition block is provided with a first threaded hole and is connected to a rear end of the drill body;
the vent hole is configured at a rear end of the first threaded hole, and a diameter of the vent hole is smaller than a diameter of the first threaded hole;
a central portion of the rear cover is provided with a spline hole;
the vent hole, the first threaded hole and the spline hole are arranged on a same axis; and
the external thread and a thread inside the first threaded hole are right-handed threads.

2. The quick-changing brazed drill according to claim 1, wherein two symmetrical first clamping surfaces are arranged in a middle portion of a side surface of the drill body.

3. The quick-changing brazed drill according to claim 1, wherein a side surface of the transition block of the quick-changing joint is provided with two symmetrical second clamping surfaces.

4. The quick-changing brazed drill according to claim 1, wherein a diameter of the drill body is 5-20 mm.

5. The quick-changing brazed drill according to claim 1, wherein a diameter of the spline hole is 5-40 mm.

6. A manufacturing process of the quick-changing brazed drill according to claim 3, comprising the following steps:
(1) processing a drill base, a joint and a rear cover;
(2) adjusting an adhesive, and dispensing the adhesive on the drill base;
(3) dispensing a diamond on the drill base, dispensing a solder on a drill bit base; and a weight ratio of the solder is: Ni (84%), Fe (4%), Cr (9%), Ti (3%);
(4) vacuum brazing and sintering a drill;
(5) punching the rear cover;
(6) assembling the drill, the joint and the rear cover;
(7) performing an overall sandblasting and a painting; and
(8) laser marking and packaging.

* * * * *